July 16, 1940.    E. F. CHANDLER    2,208,119
REMOTE CONTROL SYSTEM
Filed March 13, 1937

Inventor
Edward F. Chandler
by [signature]
Attys

Patented July 16, 1940

2,208,119

UNITED STATES PATENT OFFICE 2,208,119

REMOTE CONTROL SYSTEM

Edward F. Chandler, Brooklyn, N. Y., assignor of one-fourth to Albert C. Nolte, New York, N. Y.

Application March 13, 1937, Serial No. 130,757

4 Claims. (Cl. 192—150)

This invention relates to a remote control system for the operation of valves and similar parts of machinery, such as rams for presses, bed plates, stamps and the like.

An object of the invention is to provide a device adapted to limit the torque applied to a driven mechanism to a definite maximum value. Other objects and the advantages of the invention will be herein made to appear.

In the operation of some types of valves it is not only necessary to be able to adjust the pressure with which the valve is closed, but the apparatus should also provide a greater torque for opening the valve than is allowable for closing it. These conditions are both completely fulfilled by the present invention. The requirements of the opening and closing operation may be met, for example, by so adjusting the mechanism that during the valve opening movement the maximum torque may be applied to the valve stem to overcome the static friction and the inertia and by limiting the torque which can be applied during the closing motion of the valve. This may be accomplished by suitably adjusting one or both of the torque-release springs so that the mechanism will trip or release at a predetermined pressure corresponding to the maximum allowable torque; or, the tripping or release mechanism may be so adjusted as to require a greater angular movement and hence a greater pressure, in order to function; or, the said torque responsive means may be positively locked against movement during the initial valve opening period, preferably by a magnetically controlled latch which is adapted to be released after a few preliminary rotations of the valve stem operating means whereby the balance of the opening operation will continue under the control of the torque release mechanism. Where an electric meter is employed and the angular movement of the torque actuated element effects the stopping of the supply of electricity to the motor at the end of a stroke, interruption of the motor circuit initially, i. e., upon starting, may be prevented by an automatically operated, circuit shunting means which is adapted to be made ineffectual to prevent operation of the torque responsive means when the requirement for extra driving power has been overcome. It should be understood that the angularly moving torque responsive mechanism may be limited to movement in one direction only, if desired. For example, in the case of a gate valve, it may be desired not to jam the valve disc against the bonnet upon full opening as would be required in order to cause the torque-release mechanism to function. A simple limit gear mechanism may be substituted, operated by the motor and adapted to be set to discontinue the supply of current to the motor when the valve is fully open. The limit control mechanism shown in my Patent No. 1,654,238, entitled Remote control apparatus, issued Dec. 27, 1927, is suitable for the purpose, or any other appropriate means may be employed, when it is desired to have torque control in one direction, as when closing a valve tightly against its seat, and ordinary limit-gear control at the other extreme of travel. Upon initiating the valve closing operation substantially no extra power is called for so, as a rule, no special need to prevent premature operation of the torque or other limit mechanism as may be required when opening a valve in which the disc is tightly seated.

Figures 1, 2:
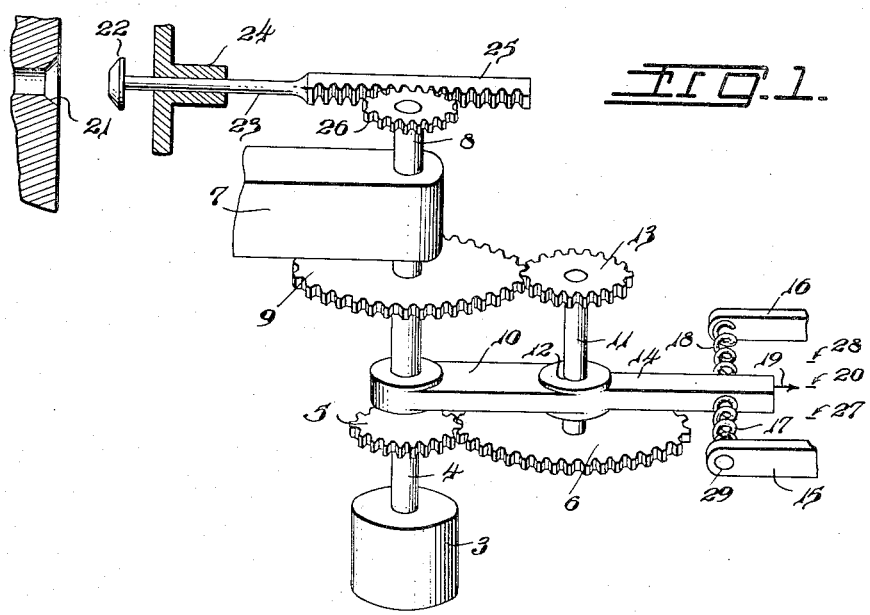
Fig. 1 is a diagrammatic perspective view of a valve operating mechanism embodying the principle of this invention.
Fig. 2 is a circuit diagram of one system of circuit connections adapted to be used with mechanism of the present invention.

Referring to Fig. 1 of the drawing, the remote control system embodying this invention comprises a motor 3, to the shaft 4 of which is attached a pinion 5, which meshes with the gear 6. Journalled in a suitable bearing 7, is a power take-off or drive shaft 8, upon which is secured the gear 9. The shaft 8 extends below the gear 9, to provide a bearing upon which the member 10 is mounted and about which it may move. Shaft 11, carried by gear 6, is journaled in member 10, at 12, and upon shaft 11 is fixed a pinion 13, which is in mesh with the gear 9, fixed to the drive shaft 8. Preferably shaft 8 is in alinement with the motor shaft 4, substantially as indicated.

The member 10 is provided with an extension 14, and is normally retained in a central position between the lugs 15, and 16, by means of the springs 17 and 18. Carried by the member 10, on the end of the extension 14, is an indicating hand 19, which normally points to the center mark 20.

For the purpose of illustration, 21 is a valve seat, 22 is a valve disc secured to the valve stem 23, carried by a part of the valve body 24. The valve stem 23 is attached to the rack 25, the teeth of which mesh with the gear 26, secured to the power shaft 8.

In the system as illustrated, with the motor driving in the direction indicated by the arrow on the motor pinion 5, it will be seen that while the gear train, comprising gears 5, 6, 13 and 9, constitute a speed reducing means, it also acts to drive the valve disc 22 toward the seat 21, thru the movement of the rack 25, by the gear 26.

Because of the resilient means 17 and 18, retaining the member 10 in a substantially fixed position, the relatively free movement of the valve stem, as it is driven toward the seat causes substantially no displacement of the indicating hand 19 from the normal point 20. However, when the disc 22 engages the seat 21, and thus increases the torque upon the shaft 8, it will be noted that a continued operation of the motor will cause the pinion 13 to roll along the face of gear 9, thereby angularly displacing member 10 about shaft 8, as indicated by the movement of the indicator hand 19, moving in the direction of dial mark 27. When the motor is stopped, the indicator 19 will return to the normal position 20, due to the action of the springs. When the motor is operated in the reverse direction, to open the valve, and the disc engages the valve part 24, the extra torque due to shaft 8 being unable to rotate, will cause gear 13 to roll along the face of gear 9 in the opposite direction causing pointer 19 to move toward mark 28.

By suitable adjusting means 29, carried by the lugs 15 and 16, any desired pressure may be exerted thru the means 17 and 18, on the member 10, so that definite measure of the torque being exerted may be indicated on a suitable dial, if desired. Obviously, the movement thus afforded may be utilized in any manner desired and/or to perform any suitable function.

For example, a machine part may be automatically and safely reciprocated without excessive vibration and jar by causing the displacement of the member 10, at each end of the stroke, to actuate a suitable motor reversing means.

In Fig. 2, 10 is the torque-responsive member provided with an extension 14, and retained in a neutral position by suitable springs 17 and 18, held in lugs 15 and 16, and adapted to be adjusted for tension by suitable means 29. A suitable control switch 30, having an operating handle 31, is adapted for starting the motor 32, in either direction. When the handle 31 has been set to start the motor in the desired direction, the switch is retained in that position by the holding magnet 33, in a well known manner. If, after starting the motor it is desired to stop it before the end of the stroke, or to reverse the operation, switch 34 may be opened by pressing the button 35. In the embodiment shown, on either side of the extension 14, switch levers 36 and 37, pivoted at 38 and 39, are held in engagement with the contacts 40 and 41 by suitable springs 42 and 43, and each is provided with a nose 44, which may be engaged by the extension 14, when it is moved as hereinbefore described. The source of energy is at 46.

With this arrangement it will be seen that when the switch 30 is set, for example to close a valve, one or the other of the switch contacts 45, will be engaged with the proper circuit terminals 46, thereby starting the motor. During operation the switch is held in position by the magnet 33, and when the valve has been seated, member 10 will be biased because of the increased torque at the end of the stroke, which will cause extension 14 to engage and open either one of the switches 40 or 41, thus de-energizing the magnet 33, which permits the switch 30 to return to neutral, discontinuing to supply of energy to the motor. Setting the switch now, in the opposite direction by means of 31, will initiate the operation of opening the valve.

Where it is desired to provide a hammer blow action, such as may be useful in unseating a tightly closed valve, this may be accomplished by the employment of a loose couple between gear 9 and shaft 8, in a well known manner or, as illustrated in my patent previously referred to herein.

In the drawing an electric motor is indicated. Obviously other types of motors may be used.

I have described what I believe to be the best embodiments of my invention. I do not wish, however, to be confined to the embodiments shown, but what I desire to cover by Letters Patent is set forth in the appended claims.

I claim:

1. In combination a stationary motor provided with a shaft, a driven member, power transmitting mechanism interposed between said motor and member, said mechanism comprising an angularly operable member, means coaxial with the motor shaft for pivotally supporting the angularly operable member, resilient means for holding said member in a normal angular position, and means whereby said member is caused to move angularly into another angular position when the said driven member reaches a predetermined point in its travel.

2. In combination, a stationary motor, a driven member, power transmitting mechanism interposed between said motor and member, spaced apart abutments adapted to be engaged by said driven member said mechanism comprising an angularly operable member, resilient means for holding said member in a normal angular position, and means whereby said member is caused to move angularly into another angular position when the said driven member comes into engagement with either of said abutments, said resilient means being adjustable to provide an adjustable amount of holding force.

3. In combination, a motor, a driven member, power transmitting mechanism interposed between said motor and member, said mechanism comprising an angularly operable member, springs engaging opposite sides of said member for normally holding said member in an intermediate position, means whereby said member is caused to move angularly into one or another extreme position, when said driving member reaches one or another predetermined position in its movement and adjustable screw members engaging the outer ends of said springs.

4. In combination, a stationary motor having a shaft, a gear secured to said shaft, a driven shaft coaxial with said motor shaft, a fourth gear secured to said driven shaft, a member pivotally mounted on said driven shaft, a stub shaft journalled in said member, second and third gears secured to said stub shaft and having different pitch diameters, said second and third gears engaging the gear on the motor shaft and fourth gear respectively, a pair of springs engaging the opposite sides of said pivotally mounted member, a fixed abutment, and a reciprocable member arranged to be moved into engagement with said abutment by the driven shaft.

EDWARD F. CHANDLER.